Aug. 4, 1970 C. J. SCHWARTZ 3,522,462

COMMUTATOR WINDING CONNECTORS

Filed Sept. 11, 1968

STAKING TOOL

INVENTOR/S
CHRISTIAN J. SCHWARTZ
BY Melville, Strasser, Foster and Hoffman
ATTORNEYS United States Patent Office 3,522,462
Patented Aug. 4, 1970

3,522,462
COMMUTATOR WINDING CONNECTORS
Christian J. Schwartz, Springfield, Ohio, assignor to Robbins & Myers, Inc., Springfield, Ohio, a corporation of Ohio
Filed Sept. 11, 1968, Ser. No. 758,966
Int. Cl. H02k
U.S. Cl. 310—234                                    10 Claims

ABSTRACT OF THE DISCLOSURE

An improved commutator and method for staking same by the steps which includes placing a plurality of insulated wire leads in a commutator wire slot, whereby said slot is characterized by substantially parallel radial sides and a substantially convex base. To this assembly, heat and pressure is applied to deform the wire leads in intimate contact with the base.

BACKGROUND OF THE INVENTION

In the typical practice of manufacturing electric motors of the type to which this invention is directed, lead wires from adjoining coils in the armature are secured to a commutator segment. The commutator is generally made of copper and is provided with a series of radial slots for receiving said wire leads. The final operation is the application of heat and pressure to the leads and copper surrounding the slots. To those skilled in the art, this operation is called a "hot staking," process.

To effect the hot staking operation, a staking tool is forced against the commutator bar directly over the slot containing the wire leads. Simultaneously therewith, an electric current is passed through the tool and into the bar to effect localized heating of the bar and lead wires. The heat promotes the forming of the bar into intimate contact with the wire and melts or softens the enameled insulation on the wire to establish good electrical contact between the wire and bar. This leaves a depression in the commutator bar as a result of the displaced copper metal being forced over and down against the wire.

The problem is securing a good electrical contact with the wire leads become more pronounced as the number of leads in the slot increases. That is, the leads most removed from the staking tool receive less heat and direct pressure. It was with these latter leads that problems developed.

While the simultaneous application of heat and pressure was recognized early as an effective means to achieve good electrical connections in commutator construction, no significant attempts were made to improve the operation in an economic manner. In this regard, attention is directed to the disclosure of U.S. Pat. No. 2,572,956, issued to Hoyt Servis on Oct. 30, 1951. Here the patentee suggested the use of a spinning tool to cause the copper to flow downwardly and inwardly of the slot. However, this operation is most effective where the number of wire leads is minimized. But, as the number of wires increase, the problems increase.

The present invention avoids such problems by providing for a substantially convex base for the wire slot. For reasons to be explained later, a more intimate contact between the bottom wire and the commutator slot is achieved.

SUMMARY OF THE INVENTION

Briefly in the practice of this invention, each of a plurality of pie-shaped commutator segments, for use in electric motors, is provided with a slot. When the segments are circumferentially arranged the slots will extend radially of said segments.

The slots which are adapted to receive wire leads, are characterized by parallel sides and a base, whose intersection with the sides form an angle less than 90°. This means that at least one crest or ridge is formed in the base. The slot configuration may be accomplished by a radial cutting saw whose teeth are staggered and alternately angled so as to give the desired shape.

With the slots thus prepared, a plurality of wire leads are introduced into each slot. A staking tool is then pressed directly against each slot causing the wire leads to deform in intimate contact with the slot base. The ridges in said base tend to more easily penetrate the enameled insulating film and permit a broader contact with the slot. This helps to assure a good electrical contact between the lowermost wire and the copper commutator bar.

DETAILED DESCRIPTION OF THE PREFERRED EMBODIMENT

Figure 1:
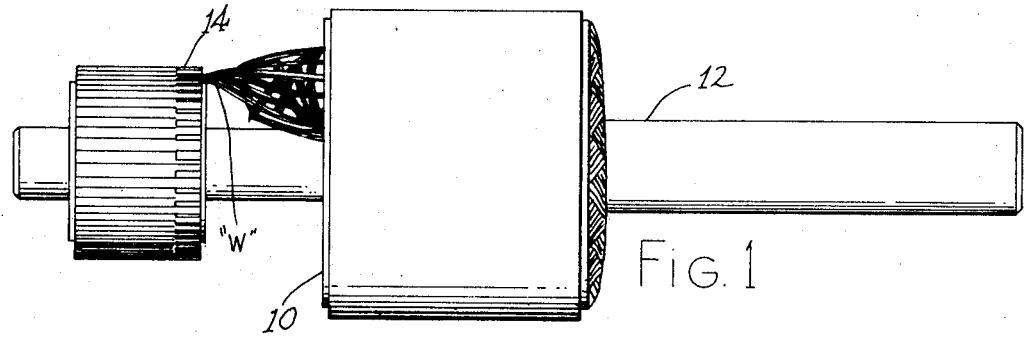
FIG. 1 repersents a typical electric motor assembly comprising an armature, rotor, and commutator.

Turning now to a consideration of the several figures it will be observed in FIG. 1 that a typical electric motor assembly comprises an armature 10, rotor 12, and a commutator 14. It is in the construction of this latter element that the present invention resides.

A commutator is generally composed of a plurality of pie-shaped copper segments 16, 16a arranged around and insulated from a central core. The several commutator segments are separated from each other by insulating strips 18. Centrally disposed within each said segment 16, 16a, is a wire slot 20, 20a respectively. It is by means of these slots that wire leads from the armature coils are secured to the commutator.

Figure 2:
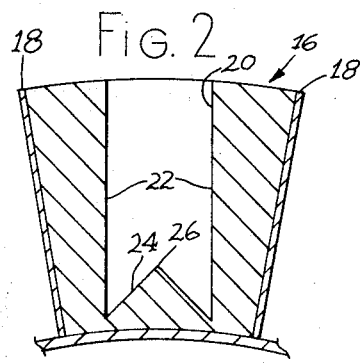
FIG. 2 is an enlarged cross sectional view of one commutator segment construction in accordance with the present invention.

Due to the problems encountered in obtaining good electrical contact between these wire leads and the commutator segments, the present invention contemplates a unique configuration for the slots 20, 20a. FIG. 2 represents one embodiment utilizing a slot 20 configured in accordance with the teachings herein. The slot is characterized by parallel sides 22 extending radially of the assembled commutator segments. The base 24 is convex and may be characterized by two intersecting planes each of which form an angle with a side 22 of less than 90°. In this particular embodiment, the angle between the side and base is 45°. By providing for a base composed of intersecting planes, a ridge or crest 26 is formed centrally of said slot. It will become clear by reason of the description to follow that this ridge promotes a better contact between the slot received wire leads and the commutator segment.

Figure 3:
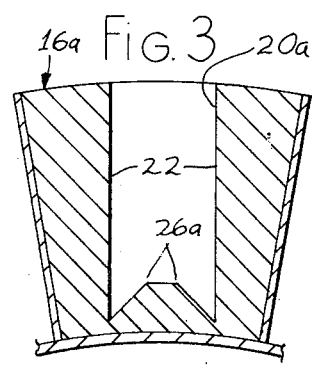
FIG. 3 is an enlarged cross sectional view similar to FIG. 2 but showing a second embodiment.

FIG. 3 is an alternative slot configured commutator. Again, the sides 22a are parallel but the shape of the base 24a has been modified by flatting the top. By this arrangement, two sharp ridges 26a are provided at the base of the slot 20a.

Figure 4:
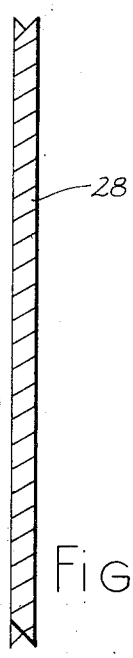
FIG. 4 is an enlarged cross sectional view of a cutting tool suitable to achieve the slot configuration of FIG. 2.
Figure 5:
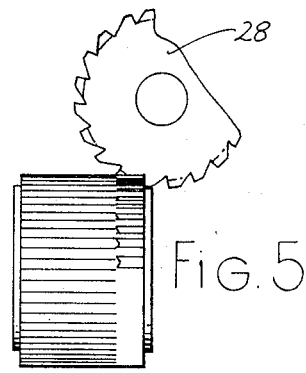
FIG. 5 is a front view of the slot cutting operation.

FIGS. 4 and 5 are presented to illustrate the manner by which the slot configuration is achieved. While the slotting tools 28 shown in FIG. 4 are suitable for the slot configuration shown in FIG. 2, the teachings herein are believed clear such that one skilled in the art could readily form the configuration of FIG. 3. For example, the slotting tool 28 in combination with a flat cutting or grinding wheel would suffice. In any event, the slotting tool 28 may comprise a radial type cutting saw whose teeth are alternatively angled and staggered to yield the slot base as shown. It should be apparent that the angle of the intersecting planes on the base 24 with the adjacent side 20 will depend upon the angle of the teeth of the slotting tool 28. For optimum results, this angle should be at least 30°.

Once the desired base configuration is achieved for the slot, the commutator is then ready for the staking operation. This operation is shown in simplified form in FIG. 6. Before considering the operation in any detail, it will be recalled that the segments of a commutator are made of copper, an electrically conductive and relatively soft metal. In order to achieve an efficiently operating electric motor, good electrical contact must be made between the connecting wires of the armature and the commutator. In order to achieve this, a hot staking operation is employed.

While the hot staking process is known per se, it is a process which operates on the combined application of heat and pressure. In the present invention, a staking tool 30 which is usually made of a tungsten alloy is forced against the upper surface 32 of the commutator segment 16, at a position directly over the slot 20 containing the lead wires W. Simultaneously with the application of pressure by the staking tool 30, an electric current is passed through the tool to effect localized heating and a resultant softening of the commutator segment and lead wires. The heat and pressure from the staking tool 30 promotes the forming of the commutator segment 16 into intimate contact with the wire. In addition, this operation causes a melting, softening, and/or breaking of the enamel insulation on the wire leads so as to establish good electrical contact between the wire and the commutator segment slot.

Figure 6:
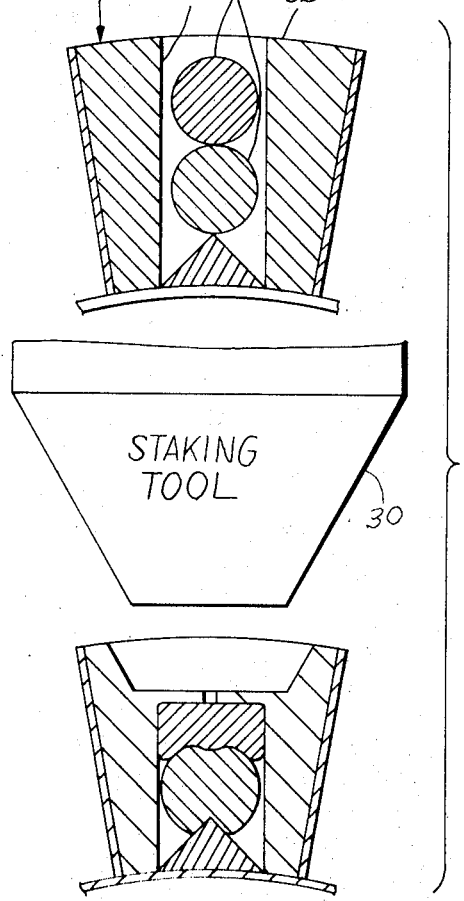
FIG. 6 is an enlarged illustration of the basic steps of the hot staking process.

It should be evident from the last illustration of FIG. 6 that in forming a depression in the commutator segment 16, the relatively soft copper metal has been displaced over and around the slot contained wires. This action cooperates with the ridges 26 and 26a to spread the wires W in the manner shown. This procedure is particularly beneficial in those situations where a plurality of wires are used. In those situations, the lowermost or bottom wire is exposed to a lesser degree of heat and pressure than the remaining wires. A good electrical contact is thus assured even though the heat reaching the lowermost wire is inadequate to melt the enamel insulating film. That is, the ridge or ridges are more likely to penetrate the film than is possible with a typical flat bottom slot.

Continuing then with FIG. 6 of this invention, the improved process taught herein relies essentially upon the known "hot staking process," but utilizes a unique slot configuration. Therefore, no attempts will be made to describe the process in detail as it is well known in the electric motor manufacturing field. It is thus accurate to say that the improved results are realized over the prior art without affecting changes in the staking process.

Due to modification which may become apparent to those skilled in the art after reading these specifications, particularly in the profile for the slot base, no limitation is intended to be imposed herein except as set forth in the appended claims.

The embodiments of the invention in which an exclusive property or privilege is claimed are defined as follows:

1. A commutator comprising a plurality of peripheral radial wire slots thereabout, said slots having opposing parallel sides extending inwardly of said commutator, and a base joining said sides, whereby the angle at the joint between the immediate base portion and each said side is less than 90°.

2. In an electric motor having an armature, a rotor, and a commutator, the improvement comprising in combination therewith, a commutator comprising a plurality of peripheral radial wire slots thereabout, said slots having opposing parallel sides extending inwardly of said commutator, and a base joining said sides, whereby the angle at the joint between the immediate base portion and each said side is less than 90°.

3. The structure claimed in claim 1 wherein the base is composed of at least two intersecting surfaces, such that the intersection forms a ridge at the bottom of said slot.

4. The structure claimed in claim 1 wherein the joint angle is at least 30°.

5. The structure claimed in claim 1 wherein the cross-section of said base between said joints is substantially triangular in configuration.

6. The structure claimed in claim 1 wherein said base is characterized by a flat portion spaced from said sides, said flat portion being substantially perpendicular to each said side.

7. The structure claimed in claim 2 wherein the base is composed of at least two intersecting surfaces, such that the intersection forms a ridge at the bottom of said slot.

8. The structure claimed in claim 2 wherein the joint angle is at least 30°.

9. The structure claimed in claim 2 wherein the cross-section of said base between said joints is substantially triangular in configuration.

10. The structure claimed in claim 2 wherein said base is characterized by a flat portion spaced from said sides, said flat portion being substantially perpendicular to each said side.

References Cited

UNITED STATES PATENTS

| | | | |
|---|---|---|---|
| 2,572,956 | 10/1951 | Servis | 310—234 |
| 3,421,212 | 1/1969 | Chabot | 310—234 |

MILTON O. HIRSHFIELD, Primary Examiner

L. L. SMITH, Assistant Examiner